United States Patent
Ormel et al.

(10) Patent No.: US 7,487,673 B2
(45) Date of Patent: Feb. 10, 2009

(54) ICE DETECTION BASED ON ANEMOMETRY

(75) Inventors: Frank Ormel, Hengelo (NL); Thorsten Honekamp, Emlichheim (DE); Christian Hoffrogge, Hopsten (DE)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 11/610,042

(22) Filed: Dec. 13, 2006

(65) Prior Publication Data

US 2008/0141768 A1 Jun. 19, 2008

(51) Int. Cl.
*G01F 1/00* (2006.01)

(52) U.S. Cl. .................. 73/170.07; 73/196; 416/39; 416/41

(58) Field of Classification Search .............. 73/170.07, 73/196; 416/39, 41
See application file for complete search history.

(56) References Cited

U.S. PATENT DOCUMENTS

| | | | |
|---|---|---|---|
| 5,639,963 A * | 6/1997 | Sustare, Jr. ............... | 73/170.08 |
| 6,619,918 B1 * | 9/2003 | Rebsdorf .................. | 416/1 |
| 6,890,152 B1 * | 5/2005 | Thisted .................... | 416/1 |
| 7,086,835 B2 * | 8/2006 | Yoshida ................... | 416/9 |
| 7,244,100 B2 * | 7/2007 | Yoshida ................... | 416/9 |
| 7,249,486 B2 * | 7/2007 | Wobben .................. | 73/1.29 |
| 7,348,683 B2 * | 3/2008 | Riesberg ................. | 290/1 R |
| 2005/0042093 A1* | 2/2005 | Yoshida .................. | 416/41 |
| 2005/0044949 A1* | 3/2005 | Wobben .................. | 73/196 |
| 2005/0169755 A1* | 8/2005 | Yoshida .................. | 416/132 B |
| 2007/0183885 A1* | 8/2007 | Ormel et al. ............. | 415/4.1 |

FOREIGN PATENT DOCUMENTS

| EP | 1748185 A1 | 1/2007 |
|---|---|---|
| WO | WO2004104412 A1 | 12/2004 |

OTHER PUBLICATIONS

T. Laakso et al. "State-of-the-art of wind energy in cold climate" IEA Annex XIX, Apr. 2003.
Seifert, H. "Betrieb von Windenergieanlagen unter Vereisungsbedingungen" 5. Österreichisches Windenergiesymposium, Okt. 21, 1999, St. Pölten, Österreich. Energiewerkst 51-61.
Seifert, H. "Technical Requirements for Rotor Blades Operating in Cold Climate"; Boreas VI, Apr. 9-11, 2003, Pyhä, Finland.
Schaffner B., "arWind Energy Site Assessment in Harsh Climatic Conditions, Long Term Experience in Swiss Alps", Report Meteotest, 2002.

* cited by examiner

*Primary Examiner*—Harshad Patel
*Assistant Examiner*—Freddie Kirkland, III
(74) *Attorney, Agent, or Firm*—GE Global Patent Operation

(57) ABSTRACT

A method for ice detection for a wind turbine is provided. The method includes providing an ice condition threshold parameter adapted for distinguishing a condition during which icing may occur and a condition during which icing may not occur, measuring a wind velocity with a first anemometer, wherein the first anemometer being of a first type, measuring a wind velocity with a second anemometer, wherein the second anemometer being of a second type, and wherein the second type is different from the first type, evaluating, for a condition during which icing may occur, a deviation of the wind velocity measured with the first anemometer and the wind velocity measured with the second anemometer, and determine whether the deviation exceeds a limit value based on a calibration conducted under a condition during which icing may not occur.

20 Claims, 5 Drawing Sheets

ICE DETECTION BASED ON ANEMOMETRY

BACKGROUND OF THE INVENTION

The present invention relates to icing of wind turbines. More particularly, the invention relates to ice detection for wind turbines and an ice detection unit. Specifically, the invention relates to a method for ice detection for a wind turbine, a method for calibrating an ice detection unit, and an ice detection unit for a wind turbine.

In the past, wind turbines experience an increasing demand. Therefore, more and more wind turbines are also planned and erected at sites with higher icing probability during the year. For example, such sites may be located in cold and hash climate like northern Europe, off-shore locations or alpine areas. These conditions lead to an increased probability of icing, i.e., ice accretion. Particularly, icing at the rotor blades of the turbines results in reduced energy output. This is based on increased mass loads on the wind turbine as well as in deterioration of the aerodynamic properties of the wind turbine. Further, regulations to shut down the wind turbine in the event ice-throw may occur further deteriorate the energy output.

Typically, the power output of the wind turbine decreases due to the icing. These and more details can be found, e.g., in "State-of-the-art of wind energy in cold climate" by T. Laakso, H. Holttinen, G. Ronsten, L. Tallhaug, R. Horbaty, I. Baring-Gould, A. Lacroix, E. Peltola, and B. Tammelin (April 2003), in "Betrieb von Windenergieanlagen unter Vereisungsbedingungen" by H. Seifert (Abstract from AUF WIND 99, ST. Pölten), in "Technical Requirements for Rotor Blades Operating in Cold Climate" by Henry Seifert, and in "arWind Energy Site Assessment in Harsh Climate Conditions" by B. Schaffner.

BRIEF DESCRIPTION OF THE INVENTION

In light of the above, according to one embodiment, a method for ice detection is provided. The method includes providing an ice condition threshold parameter adapted for distinguishing a condition during which icing may occur and a condition during which icing may not occur, measuring a wind velocity with a first anemometer, wherein the first anemometer being of a first type, measuring a wind velocity with a second anemometer, wherein the second anemometer being of a second type, and wherein the second type is different from the first type, evaluating, for a condition during which icing may occur, a deviation of the wind velocity measured with the first anemometer and the wind velocity measured with the second anemometer, and determine whether the deviation exceeds a limit value based on a calibration conducted under a condition during which icing may not occur.

Further aspects, advantages and features of the present invention are apparent from the dependent claims, the description and the accompanying drawings.

According to another embodiment, a method for calibrating an ice detection unit is provided. The method includes measuring a data set of a first anemometer for a period and under a condition during which icing may not occur, wherein the first anemometer being of a first type, measuring a data set of a second anemometer corresponding to the period, wherein the second anemometer being of a second type, and wherein the second type is different from the first type, defining a functional interrelation between the first data set and the second data set, and defining a limit value determining a deviation threshold to indicate an icing condition flag.

According to yet another embodiment, an ice detection unit is provided. The ice detection unit includes a first anemometer of a first type, a second anemometer of a second type, wherein the second type is different from the first type and wherein the second anemometer is heatable to reduce affection of the second anemometer by ice, a temperature sensor adapted for measuring an ice condition threshold parameter to distinguish a condition during which icing may occur and a condition during which icing may not occur, and an evaluation unit adapted for evaluating a functional relationship between a signal from the first anemometer and the second anemometer.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Under certain atmospheric conditions, ice will develop on the turbine components, for example, the anemometers and the blades. The commonly used ice sensor does not provide sufficient accuracy. The inability to detect ice with a desired accuracy may lead to ice-throw from the turbine blades and, as a result, the wind turbine may need to be shut down below a certain temperature.

Figure 1:
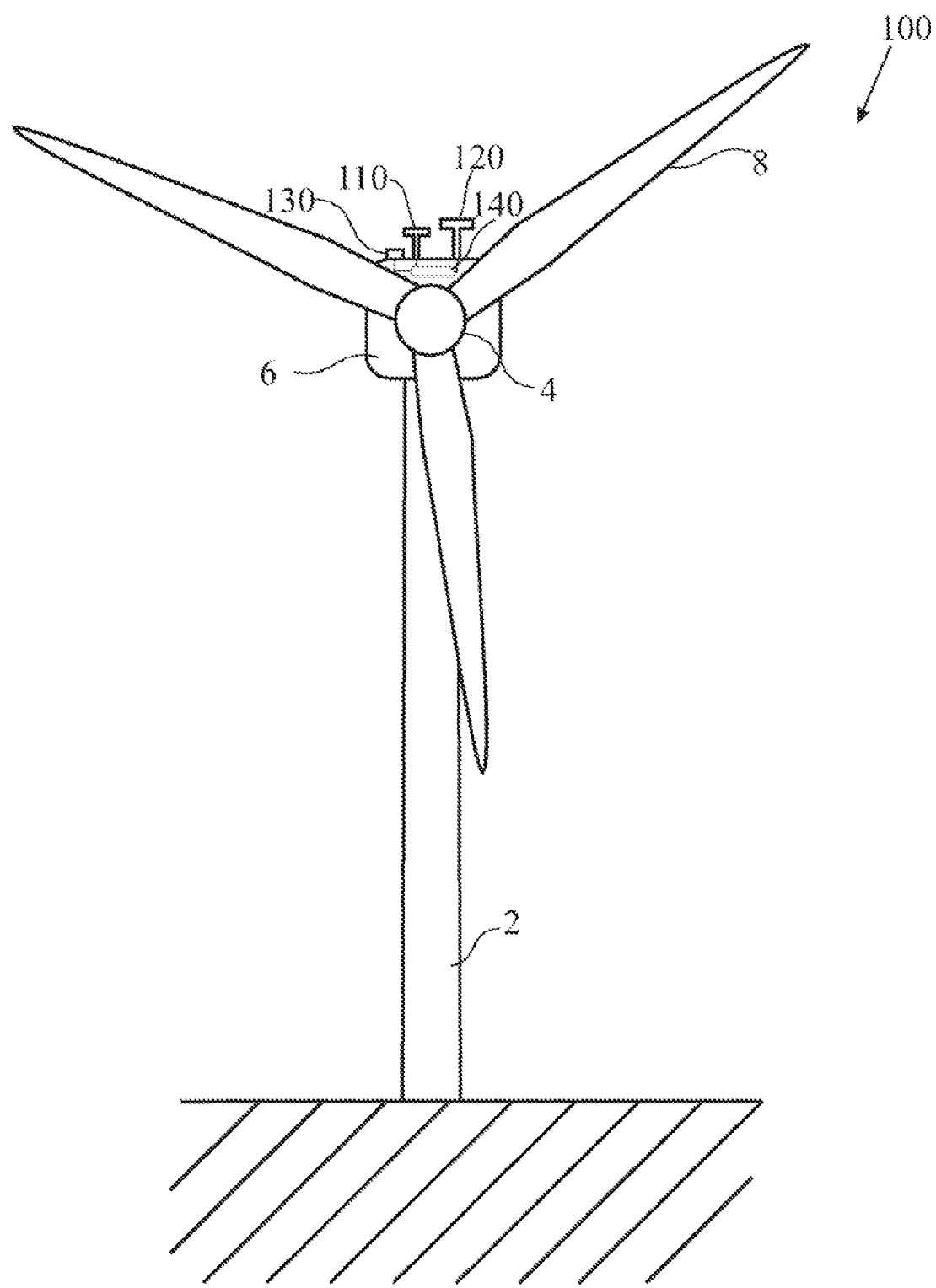
FIG. 1 shows a schematic drawing illustrating a wind turbine including an anemometer based ice detection unit according to embodiments described herein.

FIG. 1 illustrates an embodiment wherein the system for ice detection is provided on a wind turbine 100. A nacelle 6 is provided on top of the tower 2. The hub 4 is rotatably held at the nacelle 6. The rotor blades 8 are mounted to the nacelle 6. The system for ice detection includes two anemometers 110 and 120. As indicated by the different sizes of the anemometers, two different types of anemometers are provided on the nacelle 6. The first anemometer 110 is more easily affected by icing. The second anemometer 120 is less affected by icing. The signals received by the two anemometers 110 and 120 are evaluated in order to signal icing conditions.

Further, according to one embodiment, a detection unit for an ice condition parameter value 130 may be provided. The anemometers 110 and 120 and the detection unit 130 are connected to an evaluation unit. According to another embodiment, the detection unit 130 is a temperature sensor known in the art. The temperature sensor measures the temperature and determines whether the temperature is below or above a threshold value. The evaluation unit 140 receives signals from the first and second anemometer and the temperature sensor. As described with respect to FIGS. 2 to 4 below, the evaluation unit is adapted to provide a functional relationship between measurement values of the first anemometer and the second anemometer. Generally, by comparing the signal of the anemometer 120 and the signal of the anemometer 110, an ice detection signal can be generated.

According to one embodiment, the anemometer 120 is a heated sonic anemometer that does not ice easily. The anemometer 110 is a cup anemometer, which is more likely affected by icing. Therefore, on occurrence of icing at the nacelle in particularly the second anemometer 110 is affected by icing. The signals of the first anemometer 120 and the signals of the second anemometer 110 will indicate a difference in wind velocity. The differences will be described in more detail with regard to the methods illustrated in FIGS. 2 to 4 and the anemometers illustrated in FIGS. 5 and 6.

Figure 2:
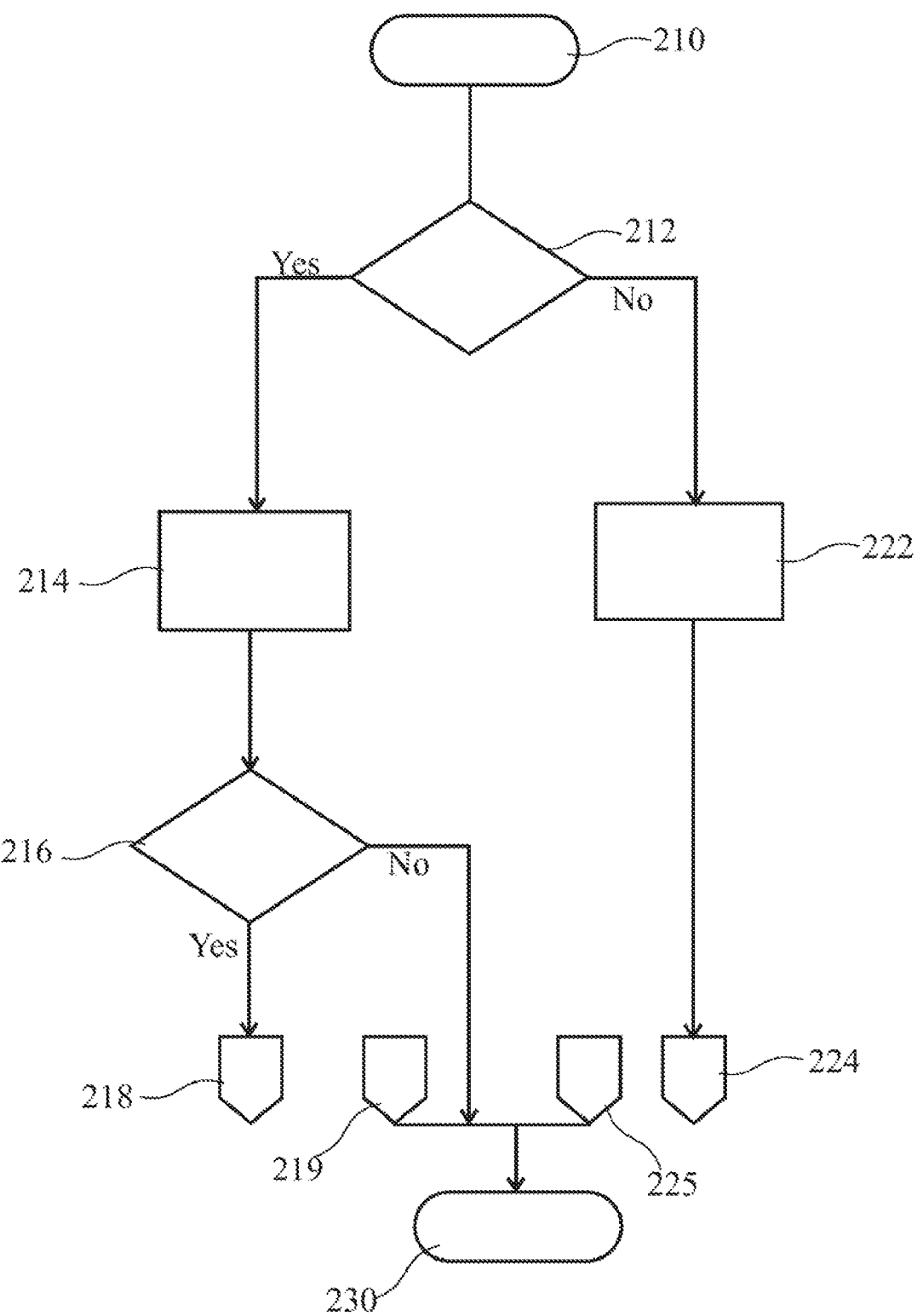
FIG. 2 shows a flow chart of an algorithm for an ice detection unit control method according to embodiments described herein.

FIG. 2 shows a flowchart illustrating a method conducted for an ice detection system. The method starts at step 210, wherein the system is initialized and, for example, predetermined parameter values are read from a memory, predetermined parameter values are provided by a user interface, or the like. Within step 212 a measured ice condition value is compared to an ice condition threshold parameter.

According to one embodiment, the ice condition threshold parameter is a temperature value. For example, if the temperature is measured with a temperature sensor and the measured temperature is above a predetermined temperature threshold parameter value, an icing condition may not occur. On the other side, if the measured temperature is below a temperature threshold parameter value, there is some likelihood that an icing condition may occur. Therefore, within step 212, it is verified if conditions are present, in which an icing condition can not occur. Such conditions can, e.g., be determined by a temperature of at least a threshold value in the range of 3° C. to 7° C., or even higher temperatures. If the temperature would be for example below 5° C. as a threshold value, an icing condition might occur.

If within step 212 it has been verified that there is no danger of icing (e.g., $T > T_{th}$: yes), the method proceeds with step 214. The left-hand side of the flowchart hereby provides a calibration branch of the method. According to one embodiment, the calibration is conducted during a condition, at which it is impossible that icing may occur. According to another embodiment, for example if icing conditions are present during long periods of operation of the wind turbine, the calibration is conducted for an icing condition threshold parameters for which it is very unlikely that an icing condition may occur.

Generally, within the embodiments described herein, a calibration is conducted for data sets gained under a condition during which no icing is present and the resulting calibration values are used for detection of an icing condition in the event the ice condition threshold parameter value indicates that an icing condition may occur.

With in step 214, a histogram of data sets, that is a histogram of signal values from the first anemometer and values from the second anemometer, respectively, are created. According to one embodiment, the histogram of the created data sets may include values in a minimum wind velocity range. According to another embodiment, the histogram of the created data sets may include values in a maximal wind velocity range. According to an even further embodiment, the created histogram may include values in a minimum and maximum wind velocity range. After generation of the histogram of the data sets, within step 216, it is evaluated whether the data sets include a sufficient number of values in each of the desired ranges. According to a further embodiment, the histogram may also be evaluated with respect to the minimum number of values per bin of the histogram.

Figure 3:
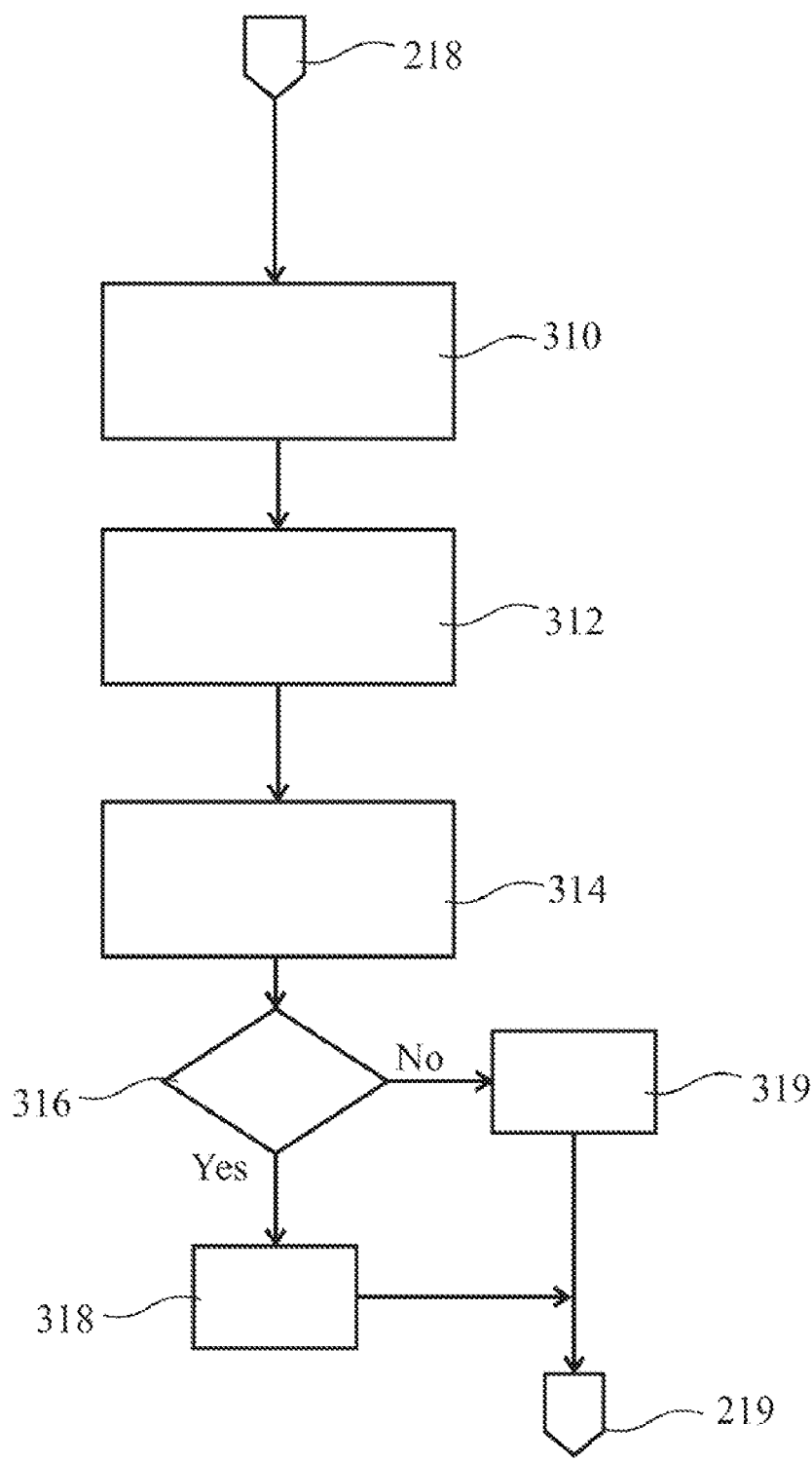
FIG. 3 shows a flow chart of an algorithm for an ice detection unit calibration method according to embodiments described herein.
Figure 4:
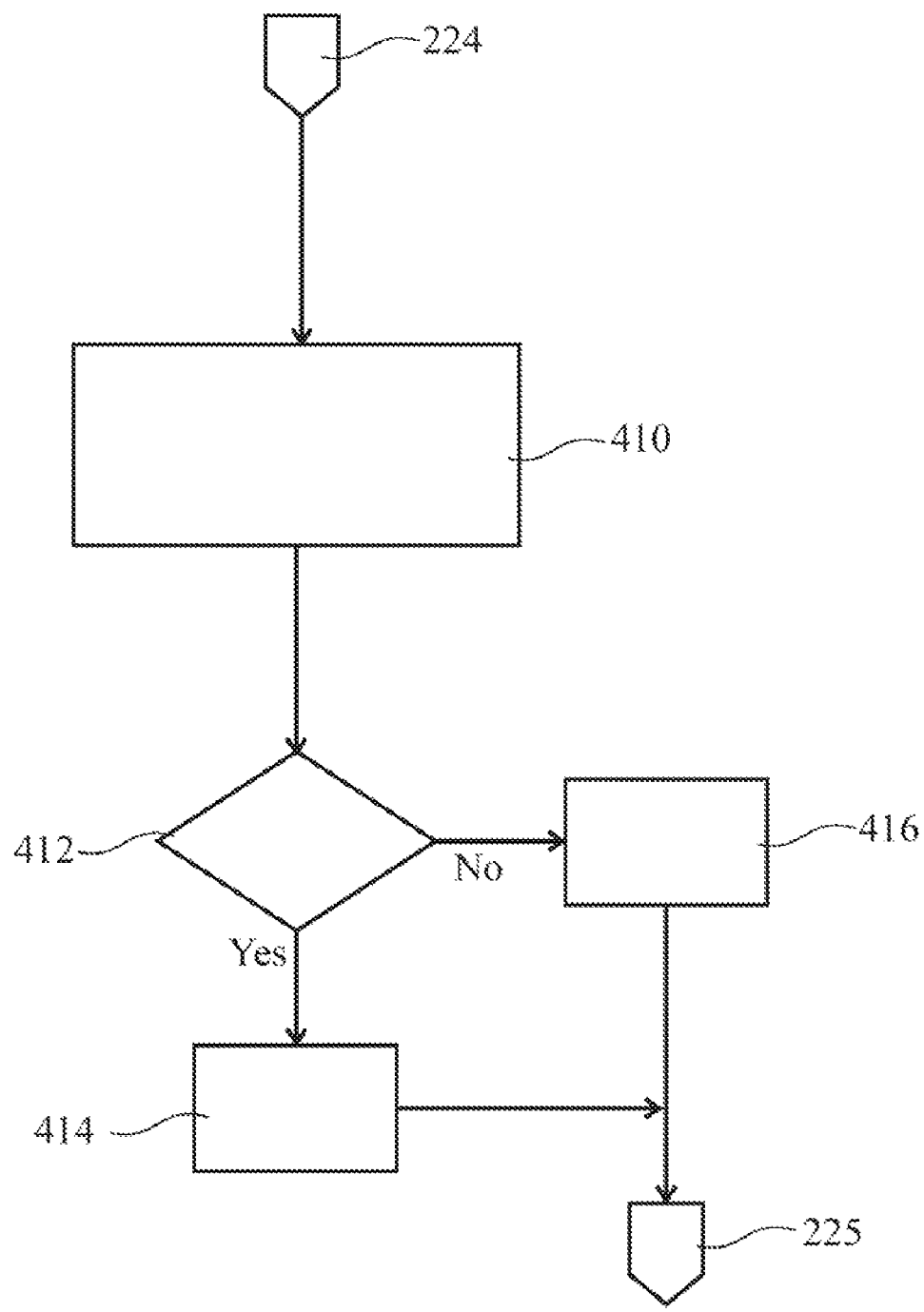
FIG. 4 shows a flow chart of an algorithm for an ice detection unit ice detection method according to embodiments described herein.

After the distribution (histogram) of the measured data sets has been evaluated in step 216 and the data sets meet the requirements for a calibration (yes), step 218 leads to a calibration method as illustrated in FIG. 3. Otherwise, the method proceeds to the step 230. In step 230 one algorithm cycle ends and another algorithm cycle may start.

A histogram of the data sets may, for example, be insufficient if only small wind velocity variations occurred during generation of the data sets. According to an embodiment, in the event data sets with an insufficient histogram for a calibration are generated these data sets might be combined with further measurement values of the first and the second anemometers, i.e., values of previous data sets or external data sets.

These further data sets may according to one embodiment be imported from a similar wind turbine. According to another embodiment, a longer data set generation period may be provided to generate more values of the first anemometer and the second anemometer. In the event imported data values are used, it is further possible to bit by bit substitute the important data by measured data after the available number of measured values in the data sets is increased. According to another embodiment, older data values may even be deleted if the number of available values in the histogram allows deletion of older values from the data sets.

Next, before describing the ice detection step 222 of FIG. 2, the calibration illustrated in FIG. 3 will be described. The embodiments illustrated with regard to FIG. 3, start in step 218 as a transfer step from the general system method to the calibration method.

Within step 310, the first anemometer may be defined as the reference anemometer and the second anemometer may be defined as the test anemometer. According to another embodiment, the first anemometer may be the test of anemometer and the second anemometer may be the reference anemometer.

Then, a linear regression is performed between the values of the two data sets corresponding to the two anemometers, respectively. As a result of the linear regression, a slope b, an offset a, and a coefficient of determination $r^2$ is calculated. Next, within step 312, a residual analysis of the data sets is performed. Therein, the residuals of the individual values of the data sets as compared to the linear regression gained in step 310 are calculated. Further, the standard deviation of the residuals is provided as a first calibration value. Within step 314, the first calibration value, that is the standard deviation of the residuals, is multiplied with a fixed parameter.

According to one embodiment, the fixed parameter is a predetermined value used for a plurality of wind turbines. The product of the standard deviation of the residuals and the fix parameter provides a maximum residual defining the limit value for an ice detection. According to another embodiment, the fixed parameter is the least 2. According to an even further embodiment, the fixed parameter is in a range of 3 to 20. Thus, within these embodiments, a limit value, which defines a threshold for ice detection, is determined in step 314.

Within step 316, a test may be conducted on at least one element selected from the group consisting of: the slope b, the offset a, the coefficient of determination $r^2$, and the number of residuals being larger than a maximum residual.

If for example the slope b, the offset a, or the coefficient of determination $r^2$ is outside a predetermined range, the method proceeds to step 318 where an ice detection unit failure flag is set to equal one. The same applies if the number of residuals being larger than a maximum residual exceeds a predetermined threshold. Thereby, an operator can be informed that the calibration failed or the ice detection unit is defective. If the slope b, the offset a, the coefficient of determination $r^2$, and the number of residuals being larger than a maximum residual is within a desired predetermined range, the calibration is defined successful in step 319, the ice detection unit failure flag is set to zero and the method proceeds in step 219 to the ice detection system method illustrated in FIG. 2.

According to a further, alternative, embodiment, if two or more elements selected from the group consisting of the slope b, the offset a, the coefficient of determination $r^2$, and the number of residuals being larger than a maximum residual are outside a predetermined range, the method proceeds to step 318 where an ice detection unit failure flag is set to equal one. Thereby, an operator can be informed that the calibration failed or the ice detection unit is defective. Otherwise, the calibration is defined successful in step 319, the ice detection unit failure flag is set to zero and the method proceeds in step 219 to the ice detection system method illustrated in FIG. 2.

If within step 212 it has been verified that there is some risk of icing (e.g., T>$T_{th}$: No), the method proceeds with step 222. Within step 222 in FIG. 2, it is determined whether a field calibration has been conducted. A field calibration is to be understood as a calibration of one of the embodiments described with respect to FIG. 3, and which is conducted on the same wind turbine as the ice detection system is used.

According to a one embodiment, in the event no field calibration has been conducted and there is no available field data to conduct a calibration, experience values may be loaded and the calibration may be conducted with external data sets. According to another embodiment data sets are present from the wind turbine itself, and a calibration has been conducted or can be conducted with the data sets. According to an even further embodiment, data sets are present from the wind turbine itself, but the histogram might not be sufficient. Then additional external data might be added to the measured data sets to calibrate the ice detection unit.

In light of the above, values for a sloped b, an offset a, and the standard deviation of the residuals as a first calibration values or an ice detection limit value as the product of the first calibration value and a predetermined factor can be provided in step 222. Within step 224, the method proceeds to the ice detection procedure described with respect to FIG. 4. Within FIG. 4, the ice detection method starts with the transfer step 224 from the ice detection system method of FIG. 2.

Within step 410 a residual analysis of the present data point is conducted. Thereby, the linear regression values slope b offset a, are used to convert one anemometer value. The converted value is compared to the other anemometer value and the residual is calculated. A residual of the present data point is determined. That is, it is determined how much one of the anemometers differs from the value calculated by the linear function of the other anemometer based on the calibrated slope and offset.

Further, the standard deviation of the residuals (as first calibration value) or the limit value as the product of the first calibration value and a predetermined factor is used. Within step 412, it is determined whether the residual of the present data point exceeds the limit value (product of first calibration value and fixed parameter). If the residual of the present data point exceeds the limit value, an ice counting indicator is increased by one (step 412). If the residual of the present data point is below the limit value, the ice counter indicator is set to zero (step 416).

Further, within step 225 the method returns to the main ice detection system algorithm. In light of the ice counting indicator, it is according to one embodiment possible that ice detection can be indicated if the ice counter value is larger than zero. Thus, one data point that indicates ice detection may be used as an indicator for icing. However, according to another typical embodiment, the ice detection system may indicate icing of the wind turbine only if the ice detection counter indicates a value larger than 1. Thereby, an icing condition is only indicated if the ice detection has at least been verified by a second ice detection data point.

After the algorithm returned to step 225 of the method described with regard to FIG. 2, one cycle terminates in step 230.

According to the embodiments described above, the ice detection of a wind turbine can be improved at least by a factor of 5. For example, a commonly used ice sensor used in a harsh climate may result in about 14% wrong icing condition indications. This means, for 14% of the ice detection events either icing is indicated in the event no icing condition was present at the nacelle or no icing indication is given for an event when icing was actually present. As a comparison in a similar harsh climate it is possible to lower the amount of erroneous icing indications with ice detection systems described herein to a value below 1.5%. Additionally, the confidence levels for the ice detection system can be improved from 85% to be near 60%. This means the ice detection system including the anemometer algorithms is almost as good as a reference ice signal.

Figure 5:
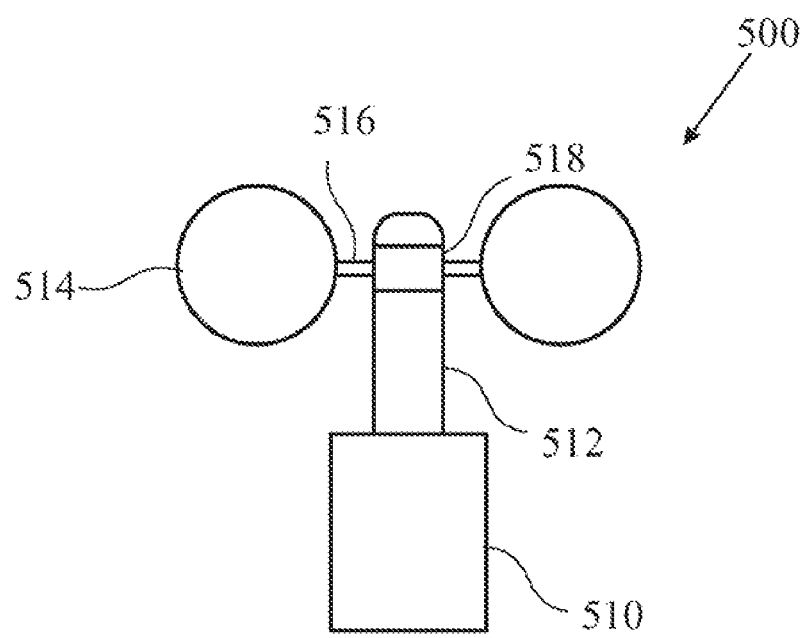
FIG. 5 shows a schematic drawing illustrating an anemometer used for embodiments described herein.
Figure 6:
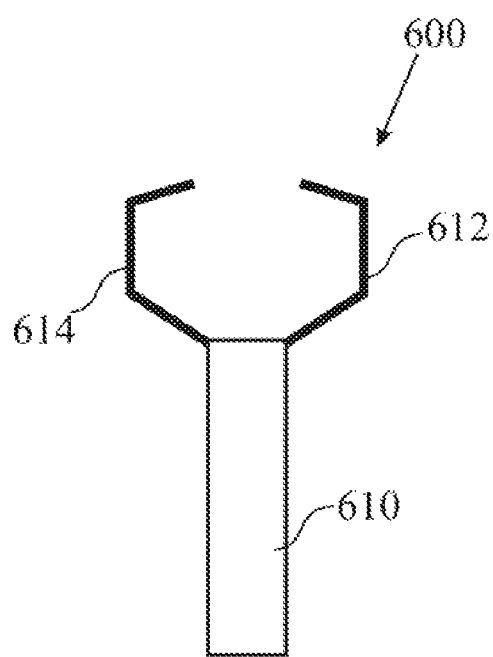
FIG. 6 shows a schematic drawing illustrating an anemometer used for embodiments described herein.

Embodiments of anemometers are illustrated in FIGS. 5 and 6. FIG. 5 shows a cup anemometer 500. On the main body 510 an axis or shaft 512 is provided. Cups 514 are mounted to the arms 516, which are rotatably fixed to the axis or shaft by a ring 518. The ring can rotate around the axis or shaft 512. According to one embodiment, the axis or shaft 512 and/or the ring 518 can be heated with a power of, e.g., 15 to 20 W. Thereby, influence of icing on the anemometer is reduced. However, as the cups may still ice over, the anemometer is relatively easy affected by icing. According to another embodiment the anemometer 500 is not heated. Thereby, climate influences are even stronger. Generally, the embodiments of a cup anemometer include three cups. However, according to other embodiments cup anemometers with four cups may also be utilized.

FIG. 6 shows an embodiment of a sonic anemometer. On the main body 610 arms 612 and 614 are provided. Both arms include sonic transceivers (or a transmitter and a receiver, respectively) which are distant to each other to provide a measurement section. The velocity of propagation of sound is superimposed with the wind velocity. Thus, the wind velocity influences the velocity of propagation of sound. A measurement of the delay of the propagation of a sound can thus be applied to determine a wind velocity. If four arms and for sonic transceivers provide two measurement sections perpendicular to each other the wind direction can be measured additionally to the wind velocity.

Further according to one embodiment, if transceivers are used, the sound propagation velocity in both directions from arm 612 to arm 614 and vice versa may be measured. Thus, dependencies of the velocity of propagation of sound from the air temperature can be eliminated. According to another embodiment, the sonic anemometer 600 can further be provided with heating. Thereby, further temperature influences apart from the air temperature can be eliminated. Consequently, the anemometers according to the embodiments described with regard to FIG. 6 are not or almost not affected by icing.

According to one embodiment, the ice detection system for a wind turbine illustrated in FIG. 1 includes a heated sonic anemometer (600 in FIG. 6) as the first anemometer 120 and a shaft heated cup anemometer (500 in FIG. 5).

According to the embodiments described herein, an improved ice detection system can be provided and the turbine may be operated with the ice detection system to prevent ice-throw as much as possible.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A method for ice detection for a wind turbine, comprising:
   providing an ice condition threshold parameter adapted for distinguishing a condition during which icing may occur and a condition during which icing may not occur;
   measuring a wind velocity with a first anemometer, wherein the first anemometer being of a first type;
   measuring a wind velocity with a second anemometer, wherein the second anemometer being of a second type, and wherein the second type is different from the first type;
   evaluating, for a condition during which icing may occur, a deviation of the wind velocity measured with the first anemometer and the wind velocity measured with the second anemometer; and
   determine whether the deviation exceeds a limit value based on a calibration conducted under a condition during which icing may not occur.

2. The method according to claim 1, further comprising:
   counting the number of times the deviation exceeds the limit value; and
   indicating an icing condition of the number of times exceeds a count threshold.

3. The method according to claim 2, wherein the limit value is a product of a standard deviation and a fixed parameter.

4. The method according to claim 3, wherein the standard deviation is the standard deviation of the residuals of a regression obtained based on data sets of the first anemometer and the second anemometer measured under a condition during which icing may not occur.

5. The method according to claim 4, wherein the data sets are generated at least once a year and the calibration is conducted at least once a year.

6. The method according to claim 1, further comprising:
   heating the first anemometer.

7. The method according to claim 6, further comprising:
   heating the second anemometer.

8. The method according to claim 1, wherein the calibration is a field calibration conducted during operation on a wind turbine on which the first and the second anemometers are disposed.

9. The method according to claim 1, wherein the data sets are generated during at least 50% of the time during a condition under which icing may not occur and the calibration is conducted at least every two month.

10. The method according to claim 1, wherein the ice condition threshold parameter is a temperature of about 2° C. to about 7° C.

11. A method for calibrating an ice detection unit, comprising:
    measuring a data set of a first anemometer for a period and under a condition during which icing may not occur, wherein the first anemometer being of a first type;
    measuring a data set of a second anemometer corresponding to the period, wherein the second anemometer being of a second type, and wherein the second type is different from the first type;
    defining a functional interrelation between the first data set and the second data set; and
    defining a limit value determining a deviation threshold to indicate an icing condition flag.

12. The method according to claim 11, wherein the functional relationship is a linear regression.

13. The method according to claim 12, wherein the limit value is based on the product of the standard deviation of the residuals from the linear regression and a fixed parameter.

14. The method according to claim 11, wherein data sets with a maximum age of 6 month are used.

15. An ice detection unit for a wind turbine, comprising:
    a first anemometer of a first type;
    a second anemometer of a second type, wherein the second type is different from the first type, and wherein the second anemometer is heatable to reduce affection of the second anemometer by ice;
    a temperature sensor adapted for measuring an ice condition threshold parameter to distinguish a condition during which icing may occur and a condition during which icing may not occur; and
    an evaluation unit configured to evaluate a functional relationship between a signal from the first anemometer and a signal from the second anemometer.

16. The ice detection unit according to claim 15 wherein the first anemometer is heatable to reduce affection of the second anemometer by ice.

17. The ice detection unit according to claim 16, wherein the first anemometer is heatable by heating the shaft of the second anemometer.

18. The ice detection unit according to claim 15, wherein the second anemometer is an ultrasonic anemometer.

19. The ice detection unit according to claim 15, wherein the second anemometer is heatable with a heating power larger than the heating power of first anemometer.

20. A wind turbine comprising an ice detection unit according to claim 15.

* * * * *